S. THOMPSON.
Stone Sawing-Machine.

No. 167,806. Patented Sept. 14, 1875.

Witnesses
John Becker
Fred. Haynes

UNITED STATES PATENT OFFICE.

SAMUEL THOMPSON, OF HART'S FALLS, NEW YORK.

IMPROVEMENT IN STONE-SAWING MACHINES.

Specification forming part of Letters Patent No. 167,806, dated September 14, 1875; application filed August 30, 1875.

*To all whom it may concern:*

Be it known that I, SAMUEL THOMPSON, of Hart's Falls, in the county of Rensselaer and State of New York, have invented certain Improvements in Stone-Sawing Machines; and I do hereby declare that the following is a full, clear, and exact description of the same, reference being had to the accompanying drawing, which forms part of this specification.

My invention relates to certain improvements, which are particularly applicable to a machine for sawing stone into blocks or slabs of tapering form by means of a gang of saws, but are equally applicable to a machine employing a single saw; and it consists in a novel construction, arrangement, and combination of a driving and guide frame, a saw-frame, and adjustable guides for said frames, whereby the accurate adjustment and operation of the parts are secured. The invention consists further in the combination, with said frames and guides, of a driving-rod and a fixed guide therefor, whereby the accurate driving of the frame is accomplished.

Figure 1:
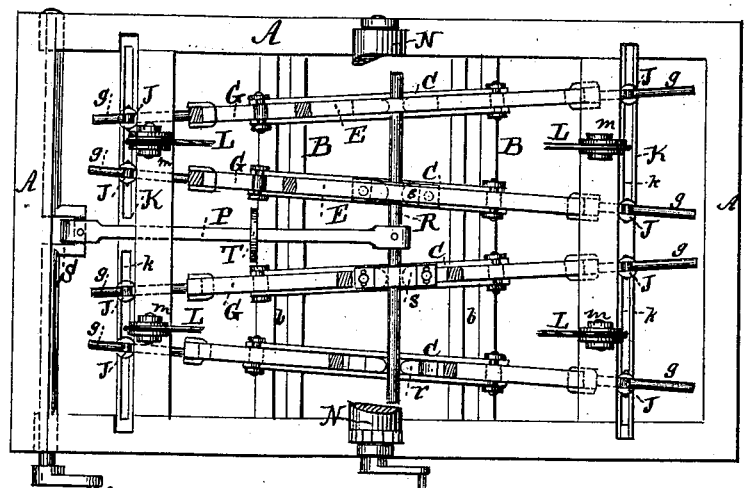
Figure 2:
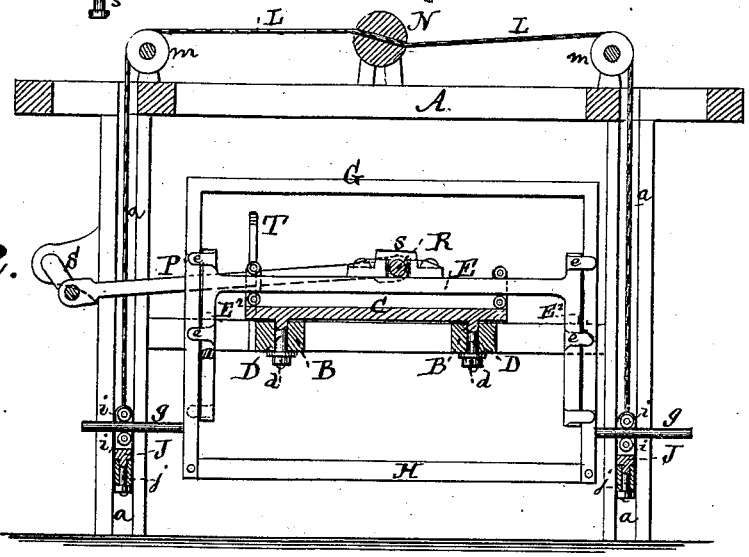
Figure 3:
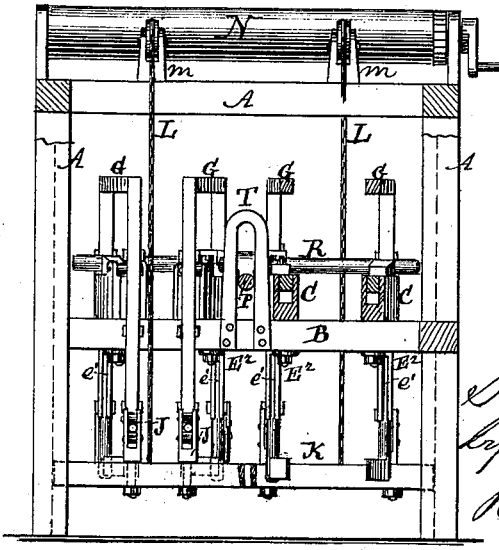

In the accompanying drawing, Figure 1 is a top view of a machine constructed according to my invention. Fig. 2 is a longitudinal vertical section. Fig. 3 is a transverse vertical section.

The working parts of the machine are attached to and supported by a frame-work, A, of any suitable construction. At a convenient height from the bottom of the frame are two slotted cross-beams, B B, upon which rest the guide for the driving and guiding frame. This driving and guide frame consists of a horizontal bar, E, and two vertical end pieces $E^2$, which latter are provided with ways or guides for the saw-frame. These ways may consist of grooves in the vertical bars, or they may be formed by lugs $e$ projecting from the bar on either side of the portion of the saw-frame which is contiguous thereto. The horizontal bar E of the driving and guide frame slides horizontally in a grooved guide, C, which rests upon the cross-beams B B. Said guide C is attached to said cross-beams, and adjustable thereon, laterally of the machine, by means of bolts D extending downward through slots $b$ in the beams B, and fastened by nuts $d$. By this means the guide C may be adjusted at any desired angle of inclination from a line parallel with the sides of the frame, and held rigidly in such position by tightening the nuts, and two guides placed side by side may be adjusted at any angle of inclination with relation to each other, so as to enable the frames to run in other than parallel directions.

The saw-frame G may be composed of a single piece, with its end pieces of round, square, or other suitable form in their cross-section, corresponding with the ways in the vertical end pieces of the driving and guide frame. The saw-frame is arranged to slide vertically on the guide-frame, but is driven horizontally thereby and simultaneously therewith; so that, as the saw is reciprocated to perform its work, it is also free to descend as the kerf becomes deeper, and, when the cut is completed, the saw may be raised and adjusted for another operation. The horizontal bar E works nicely in its guide C without deviating from a vertical line, and prevents vibration of the vertical end pieces $E^2$, and said end pieces are nearly as long as the width of the saw-frame, and thereby insure its strictly vertical up-and-down movement. In order to provide for raising the saw to the desired height, the lower portions of the end pieces $E^2$ are provided with slots $e'$, (see Fig. 3,) in which the saw H enters when it rises higher than the lower ends of said vertical end pieces $E^2$. The saw-frame guide consists of a slotted post or standard, J, supported by a slotted cross-bar, K, the ends of which work in grooves $a$ in the frame A, so as to rise and fall vertically. The lower end of the post J is provided with a screw-shank, $j$, which passes through the slot $k$ in the bar K, and is fastened by a nut on the under side of said bar. By this means the guide may be adjusted laterally of the machine by loosening the nuts and sliding the posts J along on the bar K to the desired position, and again tightening the nuts. The vertical slot in the post or standard J receives an arm, $g$, extending longitudinally from the saw-frame, and said slot may be provided with two friction-rollers, $i$ $i$, for said arm $g$ to work between. Two of the guides are used for each saw, one at each end, there being one of the rising and falling cross-beams at each end of the frame-work, so that a perfect rectilineal motion of the saw is preserved during each movement thereof. The number of guides supported by each bar K corresponds with the number of saws used in the machine, and all the guides are raised and lowered simultaneously by the raising and lowering of the bars K, which is accomplished by means of cords or chains L, which have their lower ends attached to the bars K, and pass upward and over pulleys $m$, and have their upper ends attached to a windlass or roller, N, and may be operated by mechanism, or may have counterbalance weights attached, so as to operate automatically and allow the saws to descend of their own weight as the kerf increases in depth. The saw, or a gang of saws, each arranged as above described, is driven by a pitman or driving-rod, P, the outer end of which receives motion from a crank-shaft, S, having its bearings in the frame A, and to the inner end of which is attached a cross-head, R, having bearings in the driving and guide frames E. The bearings for the cross-head may be simply notches or recesses $r$, or adjustable boxes $s$, rounded at the points of contact with the cross-head to allow of adjustment of the guides, or they may be spherical bearings of any suitable construction. The cross-head is so fitted to its bearings in the guide-frames as to allow the necessary lateral movement of the frames when in motion. The driving-rod passes through a guide consisting of a yoke, T, attached to one of the beams B, by which means it is guided during its reciprocating movements, and its rectilineal motion is preserved.

A machine constructed according to this invention may be provided with any desired number of saws, and the construction and arrangement above described admits of the ready adjustment, and insures the accurate operation of all the parts.

What I claim as new, and desire to secure by Letters Patent, is—

1. The combination of the driving and guide frame E $E^2$, the saw-frame G sliding vertically therein and moving longitudinally therewith, the stationary but adjustable driving and guide-frame guides C, and the rising and falling saw-frame guides J, substantially as herein described.

2. The combination of the driving-rod P, its fixed guide T, and the cross-head R, with the driving and guide frame, and saw-frame and their guides, substantially as herein described.

SAMUEL THOMPSON.

Witnesses:
 FRED. HAYNES,
 FERD. TUSCH.